United States Patent [19]

Noda

[11] 4,369,930
[45] Jan. 25, 1983

[54] FISHING REEL

[75] Inventor: Hideo Noda, Sakai, Japan

[73] Assignee: Shimano Industrial Company Limited, Osaka, Japan

[21] Appl. No.: 333,179

[22] Filed: Dec. 21, 1981

[30] Foreign Application Priority Data

Dec. 28, 1980 [JP] Japan .................... 55-188814[U]

[51] Int. Cl.³ ............................................. A01K 89/01
[52] U.S. Cl. .................... 242/84.1 J; 242/84.21 R; 74/543
[58] Field of Search ............ 242/84.1 J, 84.1 R, 242/84.2 R, 84.2 A, 84.2 G, 84.21 R; 74/543, 548

[56] References Cited

U.S. PATENT DOCUMENTS 2,745,607 5/1956 Taggart et al. ........... 242/84.21 R
4,196,867 4/1980 Miller ............................ 242/84.1 J
4,238,085 12/1980 Jansson et al. ............. 242/84.2 G Primary Examiner—Billy S. Taylor
Attorney, Agent, or Firm—Stevens, Davis, Miller & Mosher

[57] ABSTRACT

A fishing reel which has a handle coupled with a main shaft at a drive mechanism through a screw shaft screwed with the main shaft, the screw shaft having a head which is not-round at its outer periphery, the main shaft having at opposite axial ends thereof engaging portions each having a not-round outer periphery the same as the head, so that a cap, which is engageable with the head and a respective engaging portion, is fitted onto them, thereby coupling the screw shaft with the main shaft so they are not-rotatable relative to one other and are rotatable integrally with the handle.

2 Claims, 4 Drawing Figures

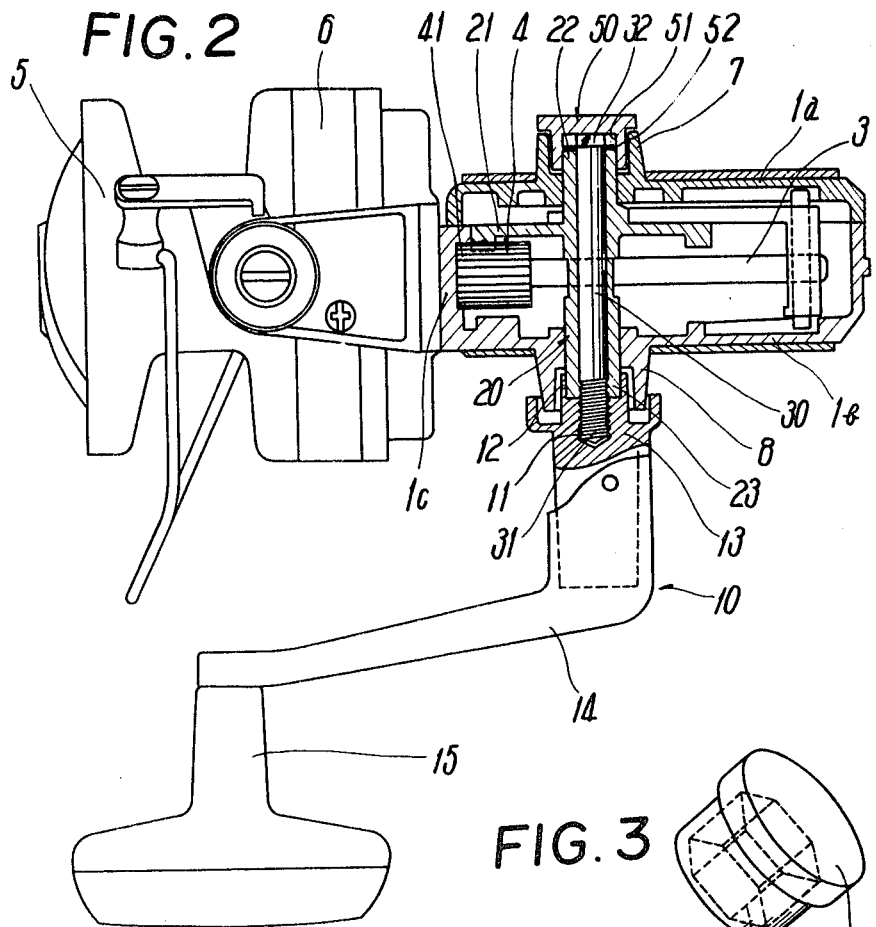
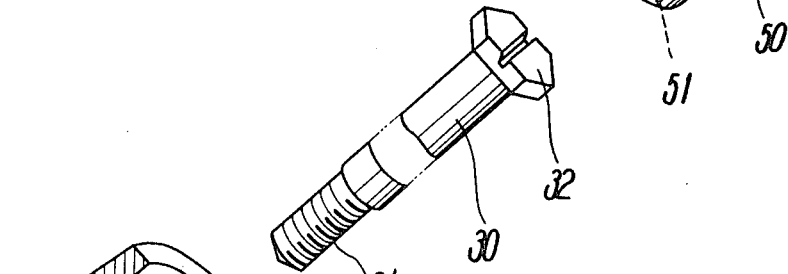
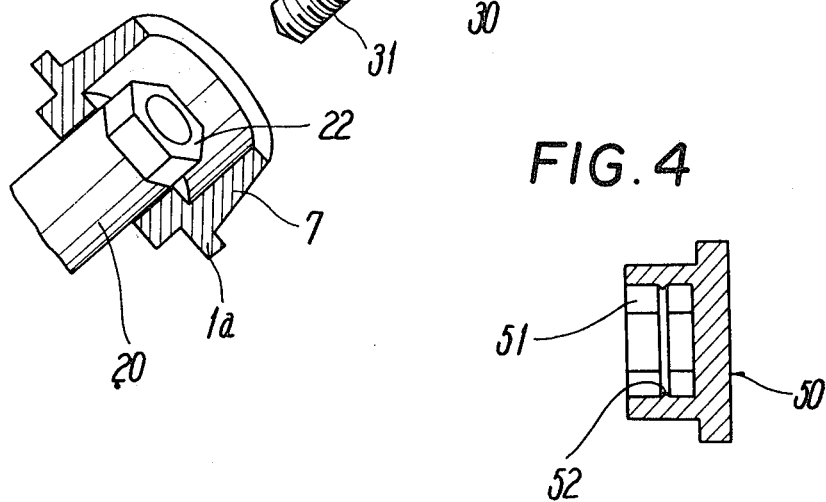

FISHING REEL

FIELD OF THE INVENTION

This invention relates to a spinning type fishing reel having a spool and a rotary frame supported on a reel body so that the rotary frame rotates to wind a fishing line onto the spool.

BACKGROUND OF THE INVENTION

Generally, the rotary frame of a conventional spinning type fishing reel is rotated by a drive mechanism comprising a handle, a tubular main shaft having a master gear, and a headed screw shaft for coupling the main shaft with the handle, the tubular main shaft being journalled to cylindrical bosses at the side walls of the reel body, the screw shaft being inserted through the main shaft and screwed at its screw thread with a threaded bore at a handle shaft to couple the handle with the main shaft, so that when the handle is turned to rotate the main shaft the rotary frame is driven through the master gear and a pinion provided at the rotary frame and engageable with the master gear.

Such screwable coupling of the main shaft with the handle, even when firmly tightened, becomes loose due to vibrations caused when the handle turns or the line is cast, and leads to an unsteady turning of the handle, whereby the screw shaft should be periodically retightened.

SUMMARY OF THE INVENTION

An object of the invention is to provide a fishing reel which is simple in construction, and free from looseness in the screwable coupling of the main shaft with the handle, so the handle is always operable in a stable condition.

The inventor has noted that the tubular shaft at the drive mechanism rotates not relative to the handle but together therewith. Therefore, the invention is so designed that a cap is used to couple the headed screw shaft with the handle in relation of rotating not relative to but integrally with each other, thereby locking the screw shaft. In detail, the tubular main shaft is provided at both axial ends thereof with engaging portions which are not-round at their outer peripheries and the screw shaft has a head which is not-round at its outer periphery the same as the main shaft. Furthermore, the cap is made not-round at its inner periphery and is engageable with the engaging portion of the main shaft and with the head of the screw shaft, so that the main shaft is coupled integrally with the screw shaft without relative rotation therebetween.

Therefore, the screwable coupling of the screw shaft with the handle, even when subjected to vibrations, does not loosen because the cap keeps them in not-relative rotation, whereby the handle is operative always in a stable condition.

These and other objects, features and advantages of the invention will become more apparent upon a reading of the following detailed specification and drawings.

BRIEF DESCRIPTION OF THE DRAWINGS

FIG. 2 is a partially cutaway plan view of the FIG. 1 embodiment, FIG. 3 is an enlarged, exploded perspective view of the principal portion of the same, and FIG. 4 is an enlarged sectional view of a cap only.

DETAILED DESCRIPTION OF THE INVENTION

Figure 1:
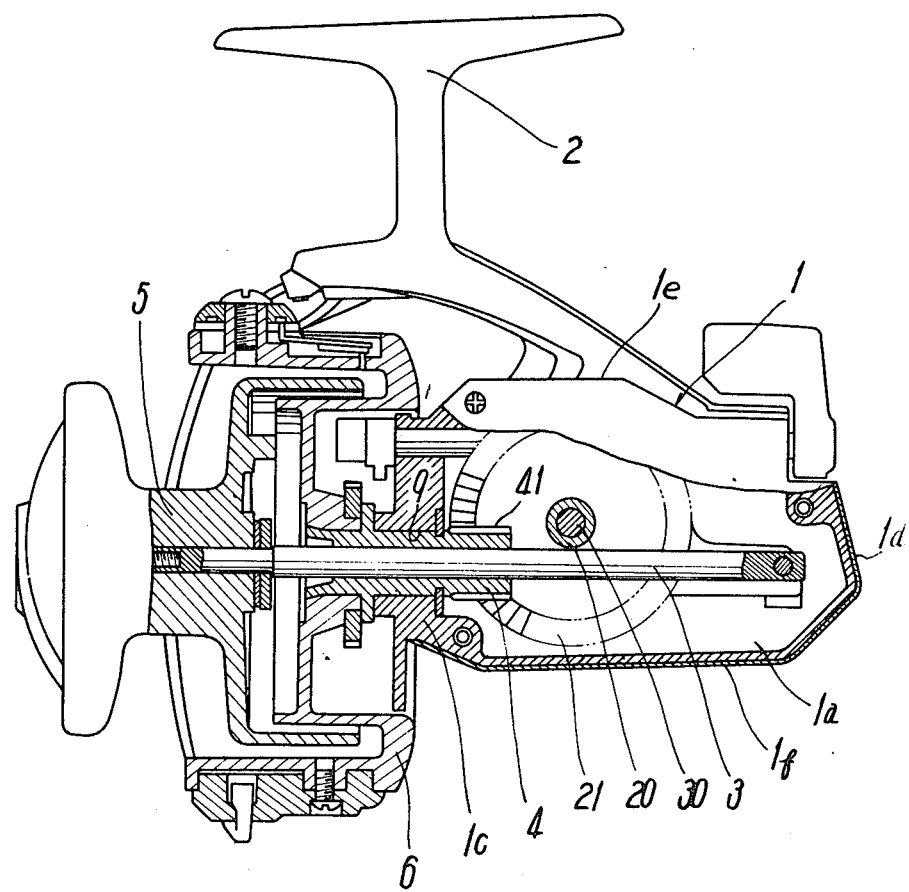
FIG. 1 is a partially cutaway side view of an embodiment of a fishing reel of the invention.

Referring to FIGS. 1 and 2, a fishing reel of the invention, as well-known, comprises; a reel body 1 which is box-like shaped and has a pair of opposite side walls 1a and 1b, a front wall 1c, a rear wall 1d, an upper wall 1e, and a lower wall 1f, the upper wall 1e providing a mounting leg 2 for a fishing rod (not shown); a spool shaft 3 and a tubular shaft 4 journalled coaxially with each other to the real body 1; a spool 5 mounted on the spool shaft 3 projecting frontward from the reel body 1; a rotary frame 6 mounted on the tubular shaft 4 projecting frontward from the same; and a drive mechanism assembled in the reel body 1 and operative to rotate the rotary frame 6 to thereby wind the fishing line onto the spool 5.

The side walls 1a and 1b at the reel body 1 have cylindrical bosses 7 and 8 respectively, the front wall 1c also having a shaft bore 9 for the tubular shaft 4, and a tubular main shaft 20 constituting the drive mechanism is journalled to the bosses 7 and 8.

The drive mechanism comprises a handle 10, the main shaft 20, and a screw shaft 30 through which the main shaft 20 is coupled with the handle 10. The handle 10, as shown in FIG. 2, comprises a stem 13 having a threaded bore 11 and an engaging bore 12 which is not-round in its inner periphery, a lever 14, and a grip 15. The main shaft 20 is larger in length than an interval between the outer surfaces of side walls 1a and 1b and is provided at an axially intermediate portion with a master gear 21 engageable with a pinion 41 mounted on one axial end of tubular shaft 4, and at both axial ends with engaging portions 22 and 23 each of which has a not round outer periphery and which is capable of engaging with the engaging bore 12 at the handle 10.

The screw shaft 30 is larger in length than the main shaft 20 and has, at the outer periphery of one axial end, a screw thread 31 screwable with the threaded bore 11 at the stem 13 of handle 10 and, at the other axial end, a head 32 having an outer periphery which is not-round and identical with that of each engaging portion 22 or 23 at the main shaft 20.

In addition, the engaging portions 22 and 23 and head 32 shown in the drawings, are hexagonal at the outer peripheries respectively.

The engaging portions 22 and 23 at the main shaft 20 journalled to the reel body 1 as abovementioned, project outwardly from the side walls 1a and 1b thereof, but are kept within the bosses 7 and 8 respectively. One engaging portion 22 or 23 insertably engages with the engaging bore 12 at the stem 13 of handle 10, and then the screw shaft 30 is inserted through the main shaft 20 and screws at the screw thread 31 with the threaded bore 11 at the handle stam 13. Hence, the handle 10 couples with the main shaft 20 so that they are not-rotatable relative to each other.

Furthermore, the drive mechanism provides a cap 50 which has a not-round inner periphery 51 engageable with the head 32 of screw shaft 30 and with the other engaging portion 23 or 22. The cap 50 is fitted onto the other engaging portion 23 or 22 and the head 32, which match with each other at the hexagonal outer periphery, so that the screw shaft 30 couples with the main shaft 20 in relation of being no-rotatable relative to each other. Hence, the screwable coupling of the threaded bore 11 at the handle 10 with the screw thread 31 at the screw shaft 30, even when subjected to vibrations, is kept free from looseness.

In addition, the cap 50 is formed mainly of a soft material, such as syntheric resin or rubber, but may be formed of other hard materials.

Also, the cap 50 is provided at its inner periphery 51 with protuberances 52 projecting radially inwardly of the cap 50, so that the protuberances 52, when the cap 50 is fitted onto the one engaging portion 22 or 23 at the main shaft 20 and the head 32 of screw shaft 30, are interposed therebetween, thereby preventing the cap 50 from escaping from the head 32.

The fishing reel of the invention constructed as foregoing, is used in such a manner that the handle 10 is turned to rotate the main shaft 20 and master gear 21, whereby the tubular shaft 4 and rotary frame 6 rotate through the pinion 41 and the line is wound onto the spool 5.

The screw shaft 30, when the handle 10 is turned, rotates together with the main shaft 20 and handle 10 through the cap 50 without relative rotation, thereby preventing looseness for occurring.

Alternatively, instead of the hexagonal shape shown the outer peripheries of the engaging portions 22 and 23 and head 32, may be formed in splines or serrations. Also, the more multiangular the respective outer peripheries are, the stronger the screwable coupling of screw shaft 30 is, thereby making more effective the connection by the cap 50.

As seen from the above, the outer periphery of the head of the screw shaft is formed in coincidence with that of each engaging portion of the main shaft, and a simple construction of only using the cap can prevent looseness of the screwable coupling of the handle with the screw shaft. Hence, the fishing reel of the invention is inexpensive to produce, has a good appearance, and the handle is always operative in a stable condition.

While a preferred embodiment of the invention has been described using specific terms, such description is for illustrative purpose only, and it is to be understood that changes and variations may be made without departing from the spirit or scope of the invention which is defined by the following claims.

What is claimed is:

1. A fishing reel comprising:
   a reel body having a pair of opposite side walls and a front wall, cylindrical bosses at said side walls, and a shaft bore at said front wall;
   a rotary frame supported freely rotatably to said reel body and having a pinion;
   a spool supported freely slidably to said reel body; and,
   a drive mechanism for rotating said rotary frame and comprising: a handle, a tubular main shaft, and a screw shaft, said handle comprising a shaft portion having a threaded bore and an engaging bore, a lever portion, and a grip, said tubular main shaft being supported rotatably to said cylindrical bosses and supporting at an intermediate portion a master gear engageable with said pinion and having at both axial ends engaging portions which are not-round at their respective outer peripheries, each said engaging portion being capable of engaging with said engaging bore at said handle in relation of being not rotatable relative to said handle, said screw shaft being supported to said tubular main shaft and having at the outer periphery of one axial end a screw thread screwable with said threaded bore at said handle and at the other axial end a head having an outer periphery which is not-round the same as the outer peripheries of said engaging portions at said tubular main shaft, said screw shaft screwing with said threaded bore at said handle, thereby coupling said handle with said tubular main shaft, said drive mechanism further comprising a cap having a not-round inner surface engageable with one of said engaging portions at said tubular main shaft and with the head of said screw shaft, so that the not-round inner periphery of said cap engages with said one engaging portion and head to thereby couple said screw shaft with said tubular main shaft in relation of being not-rotatable relative thereto and integral with said handle.

2. A fishing reel according to claim 1, whereby said cap is provided at an axially intermediate portion of the inner periphery with protuberances extending radially inwardly of said cap and engageable with the head of said screw shaft.

* * * * *